May 21, 1935.　　　H. G. M. FISCHER　　　2,001,715
METHOD OF PREPARING ORGANIC DISULPHIDES
Filed May 13, 1931
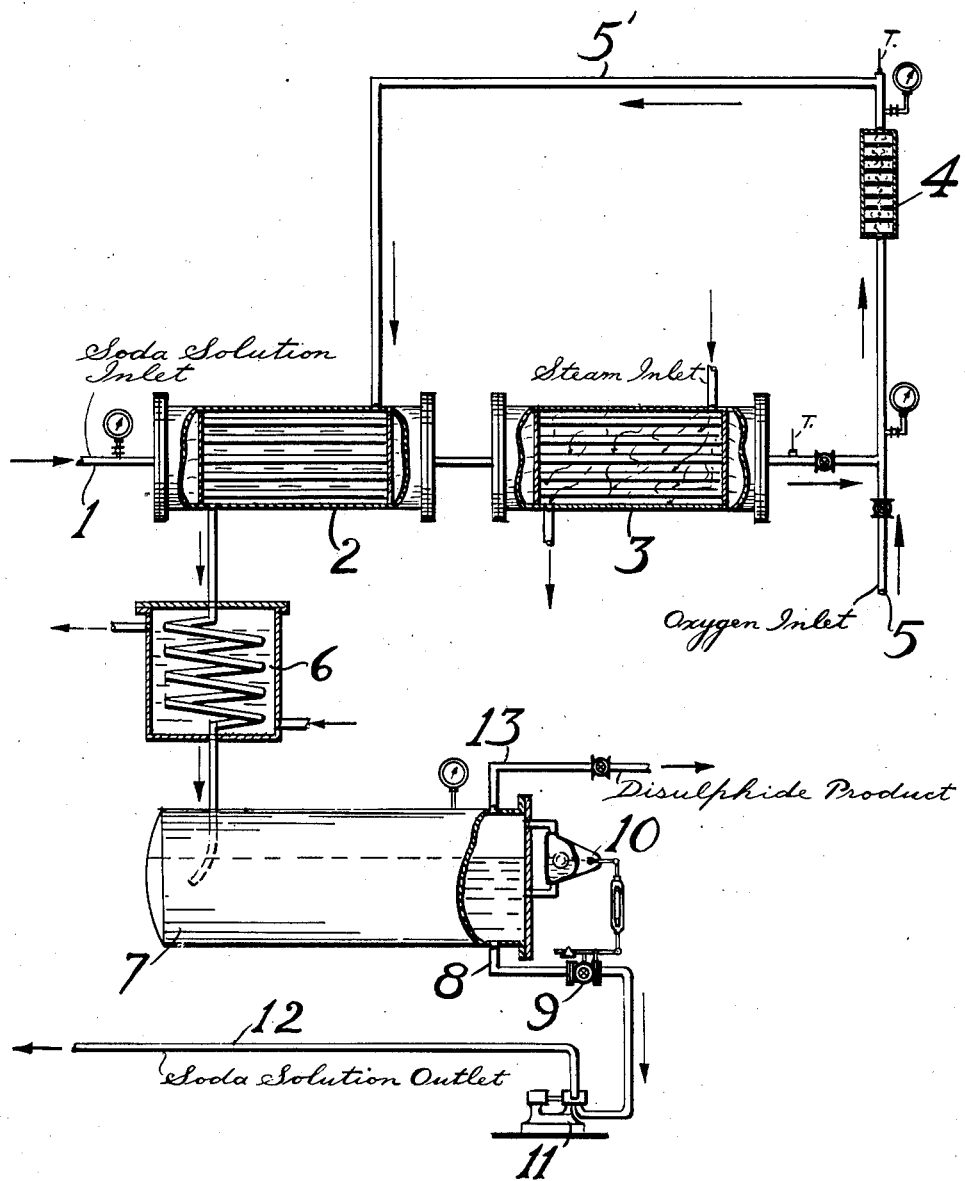

Patented May 21, 1935

2,001,715

UNITED STATES PATENT OFFICE 2,001,715

METHOD OF PREPARING ORGANIC DISULPHIDES

Herbert G. M. Fischer, Westfield, N. J., assignor to Standard Oil Development Company, a corporation of Delaware Application May 13, 1931, Serial No. 537,175

11 Claims. (Cl. 260—16)

This invention relates to improvements in processes for recovering valuable sulphur-containing compounds from treating solutions such as are obtained when removing sulphur from hydrocarbon materials. The invention is particularly applicable in the production of organic disulphides and related compounds from caustic solutions containing mercaptans and the like. These solutions are obtained to best advantage for present purposes from light fractions such as stabilizer bottoms. The invention will be described in relation to caustic soda solutions obtained in the treatment of these light naphthas, but it is understood that it is not to be limited thereto, and that it applies to the treatment of alkaline solutions used in extracting sulphur compounds from hydrocarbon materials. It is known that cracked naphthas may be satisfactorily purified of corrosive and evil smelling compounds by treatment with a solution of caustic soda. While the compounds which are removed by the caustic soda treatment are quite varied in character a majority, even up to about 95 per cent, consist of mercaptans, and these mercaptans may be readily oxidized in caustic soda solution to di-sulphides and recovered as such. The reaction may be represented by the following equation—

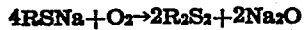

in which the radical R may represent either aryl or alkyl groups.

The invention will be fully understood from the following description of the drawing and of one method of conducting my process.

The drawing is a diagrammatic view in sectional elevation of an apparatus suitable for the purposes of my invention. A spent soda solution which has been used in treating a light "stabilizer bottoms" fraction of cracked distillate naphtha is passed by line 1 through heat exchanger 2 and steam heater 3 to a mixing column 4, all maintained at substantially the same pressure used in the soda treatment of the cracked distillate. Oxygen is admitted at the same pressure through line 5 from any convenient external source and is thoroughly mixed with the soda solution in the orifice mixing column 4. The incompletely oxidized product is passed by line 5' back through heat exchanger 2 to cooler 6 and settling drum 7. Caustic soda solution is withdrawn from the bottom of this drum by line 8 through valve 9 operated by level control 10, and is returned to the naphtha treating system by pump 11 and line 12. The upper layer forming in drum 7 is composed mainly of di-sulphides which are withdrawn through line 13 to any suitable external storage (not shown). Suitable pressure gauges and thermometers are placed in the system at the points indicated.

As an example of one method of operation of my process a distillate of 90 to 95° Baumé, boiling below 300° F., and containing 0.18 to 0.3% sulphur, from cracked high sulphur gas oil, is treated with 0.1 to 0.2 volume of a 3 to 6% aqueous solution of caustic soda at 80 pounds' pressure. The sulphur content of the naphtha is reduced by this treatment to 0.02 to 0.03%, and the caustic soda solution contains a mixture of mercaptides averaging about ethyl mercaptides in molecular weight. The spent soda solution from the above treatment is heated to about 210° F., with steam, and preferably within the limits of 100 to 400° F., and without reduction in pressure is thoroughly mixed with a carefully regulated amount of oxygen. The amount of oxygen used is desirably somewhat less than that required for the complete regeneration of the caustic soda solution and is insufficient to produce substantial amounts of oxides of carbon. Under these conditions the reaction proceeds rapidly and smoothly and the oxygen is entirely used up. Other gas mixtures containing oxygen and inert gases may be used such as air, or air enriched with oxygen, but with such mixtures the reaction rate is slower, and it is necessary to recover large quantities of the vaporized product from the fixed gases leaving the process. In batch operation, as in a bomb, it is preferable to supply an excess of oxygen, and about 20 to 40% has been found advantageous.

After the reaction of the spent soda solution with oxygen the resulting mixture is cooled to substantially atmospheric temperature, and is passed into a relatively large drum where it is permitted to separate into two layers. The bottom layer consists almost entirely of caustic soda with a very small amount of unconverted mercaptans or other sulphur compounds, and the upper layer consists almost entirely of di-sulphides. The di-sulphide mixture secured in this operation boiled between 275 and 340° F., contained 52.3% sulphur by weight, and had a specific gravity of 0.982. These di-sulphides may be further purified by suitable methods for the removal of any residual traces of mercaptans or other corrosive sulphur compounds.

The di-sulphides, either as recovered or after such purification, possess valuable properties as odorants in domestic or natural gases. They are less corrosive, less volatile and considerably less nauseating than the corresponding mercaptans, and are only slightly less efficient as gas odorizers. For example, 400 cc. of mercaptans, boiling between 30 and 100° C., and secured by steam distillation from spent soda used in treating cracked naphthas, were required for detection, by the odor, per million cubic feet of air. Under the same conditions an odor could be detected when the concentration of di-sulphides, boiling between 240 and 315° F. and secured from spent soda by my method, was below 1500 cc. per million cubic feet. The necessary concentration of both these odorants for detection was not appreciably affected by addition of commercial propane in concentration up to about 20% in the air used. Under the same conditions an odorant prepared from the acid sludges obtained from the treatment of California stocks required 2500 cc. per million cubic feet of air for detection.

The di-sulphide product may also be closely fractionated to separate the various di-sulphides such as di-methyl di-sulphide, di-ethyl di-sulphide, di-n-propyl di-sulphide, methyl-ethyl di-sulphide, methyl-n-propyl di-sulphide and similar di-alkyl sulphides, or other simple or mixed di-sulphides as may be produced, depending upon the characteristics of the cracked naphtha originally treated. Aryl di-sulphides, or mixed aryl-alkyl di-sulphides may also be obtained if the corresponding mercaptans are present in the cracked naphthas. The di-sulphides are valuable as rubber solvents and have many other solvent uses. They also dissolve sulphur mono-chloride without reaction, and may be used successfully in the cold dipping and vulcanization of rubber goods. Such goods may be readily prepared by cold dipping from solutions of rubber in the more volatile di-sulphides, especially di-methyl di-sulphide. The rubber solutions may also be used in rubber cements.

The di-sulphides are excellent denaturants for ethyl alcohol, are superior in many respects to present denaturants, and are more difficult to remove by dilution of the alcohol with water or by treatment with white oils or charcoal.

While one particular apparatus and method for production of di-sulphides from spent soda solutions used in the treating of naphthas has been described, it is understood that the invention is not limited thereto, but that it includes the preparation of di-sulphides by direct oxidation of the mercaptans both in the caustic soda solution or previously separated therefrom. Hydrogen peroxide, permanganates, di-chromates, air and other mixtures of oxygen and nitrogen or other suitable oxidizing means may be used without departing from the spirit of my invention.

While the product of such limited oxidation has been classified as di-sulphides, it is understood that the invention is not limited thereto, but includes all compounds which may be separated from naphthas by the treatment herein described. These naphthas may include cracked naphthas from both liquid and vapor phase cracking processes, hydrogenated naphthas from petroleum, or hydrogenated or destructively distilled naphthas from coal liquefaction products, coal tars, pitch, lignite, shale, shale oil, or other products of fractionation or destructive distillation therefrom.

With oils containing hydrogen sulphide it is preferable, though not always necessary, to remove the hydrogen sulphide prior to the caustic soda treatment. This may be done conveniently by fractional distillation, removing substantially all the hydrogen sulphide, propane and similar low boiling compounds as distillate, usually together with a major quantity of the iso-butane; and higher boiling compounds may be distilled off as desired. Oils containing mercaptans and other corrosive sulphur compounds are termed "sour" for the purposes of this application.

The invention is applicable to other alkaline solutions besides caustic soda, and is generally applicable to aqueous solutions of alkaline hydroxides. The invention is also applicable to the treatment of spent soda solutions used for sulphur removal from gases containing mercaptans and similar organic sulphur compounds. For example, in the copending application No. 535,304 filed May 5, 1931 of Lebo and Fischer, a method is described for preparation of sodium sulphhydrate from gases containing hydrogen sulphide and mercaptans by selective absorption of the hydrogen sulphide. The resulting gas, with a reactive sulphur content consisting largely of mercaptans, may be washed with a second solution of caustic soda which may then be treated in my process for the production of di-sulphides.

The invention is not to be limited to any example given merely for purposes of illustration, nor to any theory of the reactions, nor to any description of any particular product disclosed herein, but only to the following claims in which I wish to claim all novelty.

I claim:

1. Process of preparing an organic di-sulphide, comprising reacting upon an alkyl mercaptan in caustic solution with oxygen at a pressure above atmospheric.

2. Process for the preparation of liquid oily products containing chemically combined sulphur from a partially spent aqueous solution of caustic soda used in treating sour naphthas, which comprises subjecting the soda solution to a mild oxidation insufficient to produce oxides of carbon, and separating a supernatant oily liquid comprising alkyl di-sulphides from the reacted mixture.

3. Process for the recovery of spent caustic soda solutions used in the treating of sour naphthas boiling below 300° F. and containing mercaptans which comprises subjecting the soda solution to a mild oxidation insufficient to cause formation of carbon dioxide and sufficient to cause the separation of the major proportion of organically combined sulphur as an oily liquid comprising alkyl di-sulphides substantially immiscible with the soda solution, withdrawing the two liquids separately, and returning the soda solution to the naphtha treating process.

4. Process for the production of organic di-sulphides which comprises absorbing mercaptans from a mixture containing mercaptans and hydrocarbons with an aqueous solution of caustic soda, subjecting the soda solution to a mild oxidation insufficient to cause reaction of the total mercaptans absorbed, and separating a resulting supernatant oily layer containing di-sulphides from the product of oxidation.

5. Process for the production of organic di-sulphide comprising the steps of absorbing mercaptans from a sour cracked naphtha boiling below 300° F. with an excess of an aqueous solution of caustic soda, mixing the soda solution with an amount of oxygen insufficient to cause reaction of the total mercaptans absorbed at an elevated temperature below 400° F. and at pressures above the vapor pressure of the soda solution, cooling the products and separating an oily supernatant layer containing organic di-sulphides.

6. Process according to claim 5 in which the oxidation is conducted at a temperature of about 210° F.

7. Process according to claim 5 in which the oxidation is conducted at a pressure of about 80 pounds per square inch.

8. Process according to claim 5 in which the sour cracked naphtha used for the soda absorption is a distillate fraction which has been substantially freed of propane and lower boiling constituents by fractionation.

9. Process for the production of organic di-sulphides from mercaptans contained in sour naphthas comprising the steps of fractionating the naphtha to remove substantially all hydrogen sulphide and lower boiling compounds, treating the residue under fractionation pressure with an excess of an aqueous solution of caustic soda, mixing the soda solution with oxygen, at a temperature of 100° F. to 400° F. and at substantially the same pressure, in an amount insufficient to cause reaction of the total mercaptans absorbed, cooling and withdrawing an oily liquid product consisting mainly of di-sulphides.

10. Process for the preparation of liquid oily products containing chemically combined sulphur from a partially spent aqueous solution of caustic soda used in treating sour naphthas which comprises subjecting said soda solution to a mild oxidation sufficient to cause the separation of the major proportion of organically combined sulphur as an oily liquid substantially immiscible with the soda solution and separately withdrawing said liquid from said solution.

11. Process for the production of organic di-sulphide, comprising the step of absorbing mercaptans from a sour petroleum naphtha with an aqueous alkali, separately withdrawing the resulting aqueous solution, contacting said solution with an oxygen-containing gas at a pressure above atmospheric and at a reaction temperature to cause formation of di-sulphides from said mercaptans, cooling the products and separating the resulting oily supernatant layer containing organic di-sulphides.

HERBERT G. M. FISCHER.